US 9,884,425 B2

(12) United States Patent
Yamaguchi et al.

(10) Patent No.: US 9,884,425 B2
(45) Date of Patent: Feb. 6, 2018

(54) ROBOT, ROBOT CONTROL DEVICE, AND ROBOTIC SYSTEM

(71) Applicant: Seiko Epson Corporation, Tokyo (JP)

(72) Inventors: Yukihiro Yamaguchi, Matsumoto (JP); Koichi Yasuda, Chino (JP); Kenji Matsuura, Matsumoto (JP)

(73) Assignee: Seiko Epson Corporation (JP)

( * ) Notice: Subject to any disclaimer, the term of this patent is extended or adjusted under 35 U.S.C. 154(b) by 28 days.

(21) Appl. No.: 15/072,648

(22) Filed: Mar. 17, 2016

(65) Prior Publication Data
US 2016/0288333 A1 Oct. 6, 2016

(30) Foreign Application Priority Data
Mar. 30, 2015 (JP) .................. 2015-068273

(51) Int. Cl.
*B25J 9/16* (2006.01)
(52) U.S. Cl.
CPC ........... *B25J 9/1697* (2013.01); *B25J 9/1692* (2013.01); *G05B 2219/39022* (2013.01); *G05B 2219/40611* (2013.01)
(58) Field of Classification Search
CPC ........ B25J 9/1692; B25J 9/009; B25J 9/1694; B25J 9/1697; Y10S 901/05; G01B 21/042; G01B 2210/58; G05B 2219/39049; G05B 2219/39019; G05B 2219/39022; G05B 2219/40611
USPC ..... 700/193, 170, 254, 279; 318/572; 901/5, 901/8
See application file for complete search history.

(56) References Cited

U.S. PATENT DOCUMENTS

| 5,053,976 A * | 10/1991 | Nose .................... G05B 19/427 |
| | | 700/251 |
| 5,297,238 A * | 3/1994 | Wang .................... B25J 9/1692 |
| | | 700/254 |
| 7,161,321 B2 | 1/2007 | Ban et al. |
| 9,043,024 B2 * | 5/2015 | Chiu .................... B25J 9/1692 |
| | | 318/568.22 |
| 2010/0161129 A1 * | 6/2010 | Costa .................... B25J 9/1697 |
| | | 700/259 |

FOREIGN PATENT DOCUMENTS

| JP | 08-085083 A | 4/1996 |
| JP | 2005-300230 A | 10/2005 |

* cited by examiner

*Primary Examiner* — Dalena Tran
(74) *Attorney, Agent, or Firm* — Harness, Dickey & Pierce, P.L.C.

(57) ABSTRACT

A robot includes an arm, and the arm is controlled using an offset of a reference point of a tool, the tool being attached to the arm, the offset being set based on a first state, in which a first image, in which the reference point is located at a control point of an image, can be taken by a imaging section, and a second state, in which a second image, in which the tool is rotated around a rotational axis passing through a position of the reference point in the state in which the reference point is located at the control point, can be taken by the imaging section, and controlled based on a third image, which is taken by the imaging section, and in which the control point is shifted from the reference point, in a process of a transition from the first state to the second state.

12 Claims, 7 Drawing Sheets

ROBOT, ROBOT CONTROL DEVICE, AND ROBOTIC SYSTEM

BACKGROUND

1. Technical Field

The present invention relates to a robot, a robot control device, and a robotic system.

2. Related Art

In the past, there has been performed a process of setting an offset of a tool to an arm before processing a work using the tool attached to the arm. In JP-A-8-85083 (Document 1), there is disclosed a method of deriving the offset of the tool to the arm based on a result obtained by performing an operation of aligning the tool attached to the arm with a control point in the real space a plurality of times with the posture of the arm changed.

According to the technology described in Document 1, it is necessary for the operator to operate the arm so that the tool has contact with the control point to thereby teach the position of the control point. However, it is not easy to accurately operate the arm while visually identifying the boundary between the state in which the arm has contact with the control point and the state in which the arm does not have contact with the control point. Therefore, in the technology described in Document 1, there is a problem that it is difficult to accurately teach the position of the control point. Further, if it is assumed that the offset of the tool is set while correctly teaching the position of the control point, there is a problem that the time necessary for the setting is elongated, and the more the number of the robots of the setting target increases, the more serious the problem becomes.

SUMMARY

A first robot according to an aspect of the invention includes an arm, to which a tool can be attached, and which is capable of moving the tool to a position where the tool can be imaged by a imaging section, and the arm is controlled using an offset of a reference point of the tool to the arm, the tool being attached to the arm, the offset being set based on a first state, in which a first image, in which the reference point is located at a control point of an image, can be taken by the imaging section, and a second state, in which a second image as an image, in which the tool is rotated around a rotational axis passing through a position of the reference point in the first state, can be taken by the imaging section, and controlled based on a third image, which is taken by the imaging section, and in which the reference point is shifted from the control point, in a process of a transition from the first state to the second state.

A second robot according to another aspect of the invention includes an arm to which an imaging section is attached, and which is capable of moving in a working space, and the arm is controlled using an offset of the imaging section to the arm, the offset being set based on a first state, in which a first image, in which a reference point in the working space is located at a control point of an image taken by the imaging section, can be taken by the imaging section, and a second state, in which a second image as an image, in which the imaging section is rotated around a rotational axis passing through a position of the reference point in the first state, can be taken by the imaging section, and controlled based on a third image, which is taken by the imaging section, and in which the reference point is shifted from the control point, in a process of a transition from the first state to the second state.

According to these aspects of the invention, since the offset of the tool or the imaging section to the arm is automatically set based on the image taken by the imaging section, the offset can easily be set. Here, the reference point is a point fixed to the tool or the real space, and only required to be a point which can be recognized using the image recognition. Further, it is sufficient for the control point in the image to be a point determined in advance in the image coordinate system.

It should be noted that the function of each of the constituents described in the appended claims can be implemented by a hardware resource the function of which is specified by the configuration itself, a hardware resource the function of which is specified by a program, or a combination of these hardware resources. Further, the functions of the constituents are not limited to those implemented by respective hardware resources physically independent of each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
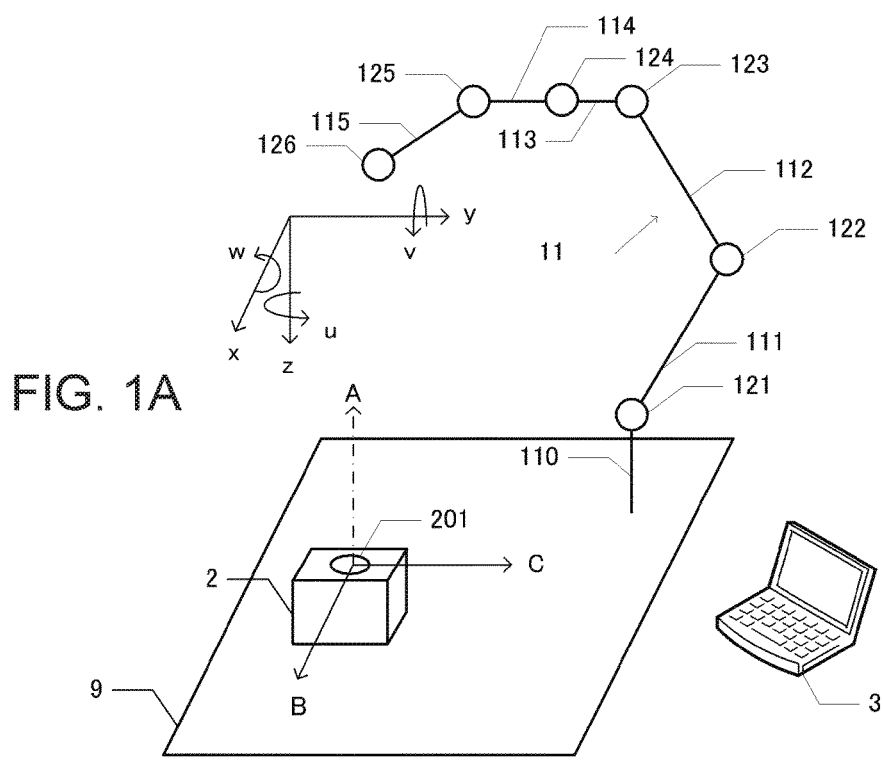
FIG. 1A is a schematic perspective view related to an embodiment of the invention.

Some embodiments of the invention will hereinafter be described with reference to the accompanying drawings. It should be noted that in the drawings, constituents corresponding to each other are denoted by the same symbols, and the duplicated explanation will be omitted.

1. Outline

Figure 1B:
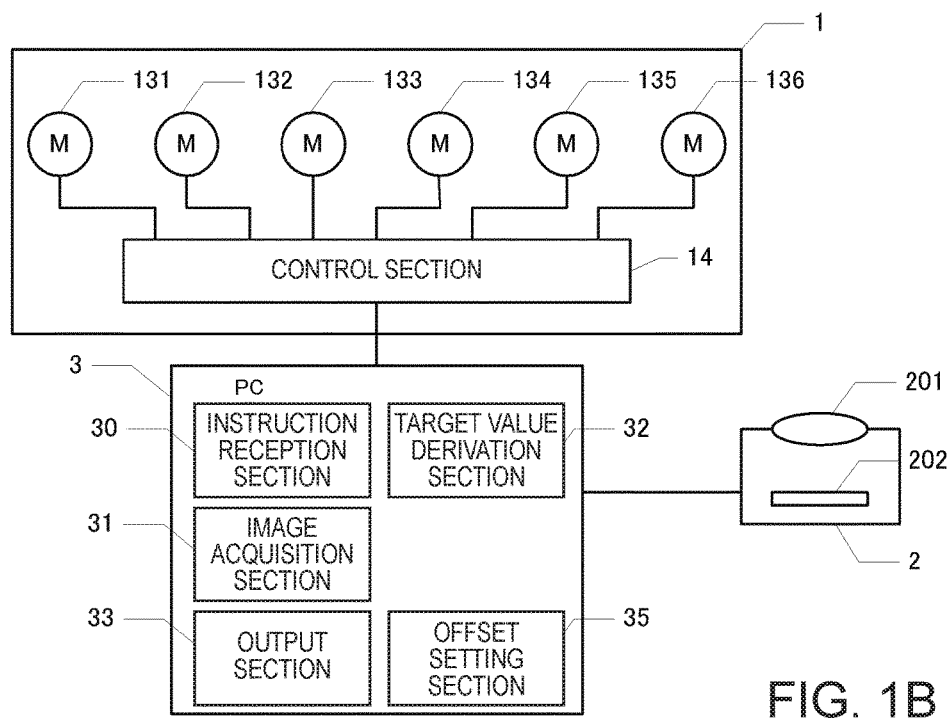
FIG. 1B is a block diagram related to the embodiment of the invention.

As shown in FIG. 1B, robotic system as a first embodiment of the invention is provided with a robot 1, an imaging section 2, and a personal computer (PC) 3 as a robot control device.

The robot 1 is a six-axis robot having an arm provided with six rotary shaft members 121, 122, 123, 124, 125, and 126. The center of the tip of the rotary shaft member 126, to which a variety of tools for operating the work are attached, is referred to as a tool center point (TCP). The position and the posture of the TCP are used as references of the position and the posture of each of a variety of tools. A coordinate system of the robot 1 used when controlling the robot 1 is a three-dimensional orthogonal coordinate system determined by an x axis and a y axis each extending horizontally, and a z axis, the positive direction of which is a vertically downward direction. Hereinafter, such a coordinate system of the robot 1 is also referred to as a robot coordinate system. Further, a rotation around the z axis is represented by u, a rotation around the y axis is represented by v, and a rotation around the x axis is represented by w. The unit of length of the robot coordinate system is millimeter, and the unit of angle thereof is degree.

The imaging section 2 is a camera for recognizing the size, the shape, and the position of the work in a reference plane perpendicular to the z axis. It is assumed that a direction A away from a lens 201 and along the optical axis of the lens 201 is referred to as an imaging direction. The coordinate system of the imaging section 2 is a coordinate system of an image output from the imaging section 2, and is determined by a B axis the positive direction of which is a horizontally rightward direction of the image, and a C axis the positive direction of which is a vertically downward direction of the image. Hereinafter, the coordinate system of the image output from the imaging section 2 is also referred to as an image coordinate system. The unit of length of the coordinate system of the imaging section 2 is pixel, and the unit of angle thereof is degree. The positional relationship between an area image sensor 202 and the lens 201 is determined so that the centroid of the image taken by the imaging section 2 corresponds to the center of the optical system. In other words, a point on the optical axis of the lens 201 is imaged at the centroid of the image. The coordinate system of the imaging section 2 is a two-dimensional orthogonal coordinate system obtained by non-linearly converting a coordinate system of a plane in the real space perpendicular to the optical axis of the lens 201 in accordance with the optical characteristics (e.g., a focal distance, and a distortion) of the lens 201 and the number of pixels and the size of the area image sensor 202. Therefore, in order to recognize the size, the shape, or the position of the work in the reference plane based on the image output by the imaging section 2, and then control the robot 1 based on the recognition result, there becomes necessary a process of associating the image coordinate system with the robot coordinate system, namely a calibration.

The PC 3 is connected to the robot 1 and the imaging section 2. In the PC 3, there are installed a calibration program for calibrating the robot coordinate system and the image coordinate system with each other, and a tool setting program for setting an offset of the tool.

According to the embodiment of the invention described below, since the offset of the tool attached to an arm 11 is automatically derived and then set using a robot vision (the image taken by the imaging section 2) in the state in which the calibration has not been performed, the setting operation, which is performed before attaching an unknown tool to the robot 1 and then using the unknown tool, can easily be performed in a short time.

2. Configuration

As shown in FIG. 1A in a simplified manner, the robot 1 is provided with the arm 11 formed of a first arm 111, a second arm 112, a third arm 113, a fourth arm 114, and a fifth arm 115, and a platform 110. The platform 110 supports the rotary shaft member 121 of the first arm 111. The first arm 111 rotates with respect to the platform 110 together with the rotary shaft member 121 centered on the central axis of the rotary shaft member 121. The first arm 111 supports the rotary shaft member 122 of the second arm 112. The second arm 112 rotates with respect to the first arm 111 together with the rotary shaft member 122 centered on the central axis of the rotary shaft member 122. The second arm 112 supports the rotary shaft member 123 of the third arm 113. The third arm 113 rotates with respect to the second arm 112 together with the rotary shaft member 123 centered on the central axis of the rotary shaft member 123. The third arm 113 supports the rotary shaft member 124 of the fourth arm 114. The fourth arm 114 rotates with respect to the third arm 113 together with the rotary shaft member 124 centered on the central axis of the rotary shaft member 124. The fourth arm 114 supports the rotary shaft member 125 of the fifth arm 115. The fifth arm 115 rotates with respect to the fourth arm 114 together with the rotary shaft member 125 centered on the central axis of the rotary shaft member 125. The fifth arm 115 supports the rotary shaft member 126 to which the tool is attached.

Figure 2:
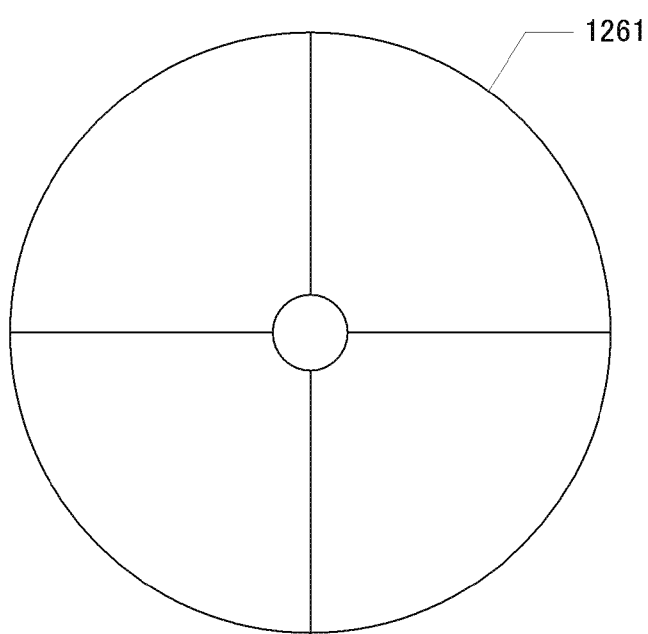
FIG. 2 is a plan view related to the embodiment of the invention.

The rotary shaft member 126 as the tip of the arm 11 is provided with a tool chuck 1261, an attachment surface of which for a tool is shown in FIG. 2. To the tool chuck 1261, there are attached a variety of tools for operating the work. As shown in FIG. 2, the attachment surface of the tool chuck 1261 is divided into four parts, and a rod-like attachment section of the tool is inserted in a central area of the attachment surface. The center of the attachment surface of the tool chuck 1261 corresponds to the TCP. In the state in which the tool is normally attached to the tool chuck 1261, the central axis of the attachment section of the tool coincides with the rotational axis of the rotary shaft member 126.

Figure 3A:
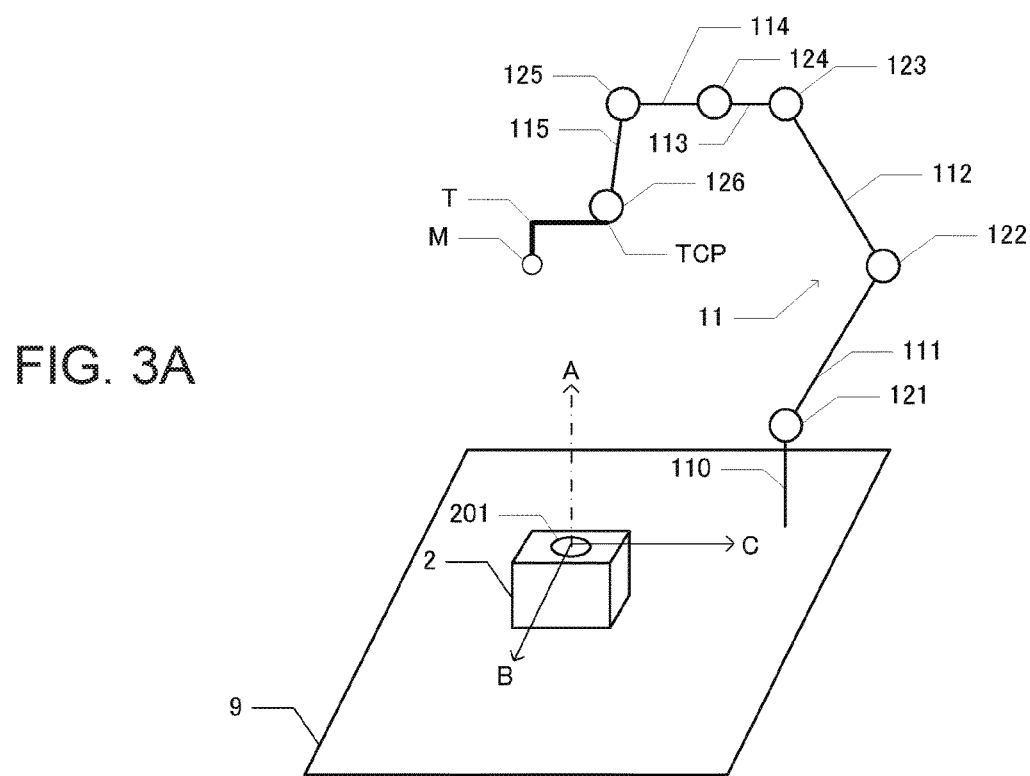
FIG. 3A is a schematic perspective view related to the embodiment of the invention.

In the present embodiment, the tool T shown in FIG. 3A is attached to the tool chuck 1261, and the offset of the tool T to the TCP is derived. The tip of the tool T is set as a reference point, the offset of which to the TCP is to be obtained. The offset is set in the coordinate system fixed to the TCP. Specifically, the coordinate of the reference point of the tool is set as the offset of the tool in the coordinate system, which has the origin corresponding to the TCP, one axis parallel to the rotational axis of the rotary shaft member 126, and two axes perpendicular to the one axis, and rotates together with the rotary shaft member 126.

It is easy to insert the rod-like attachment section of the tool into the tool chuck 1261 up to a predetermined depth. Therefore, in the present embodiment, it is assumed that a predetermined value is set as an offset component of the one axis parallel to the rotational axis of the rotary shaft member 126, and offset components of the other two axes are derived and set using the tool setting process described later.

Figure 3B:
FIG. 3B is a plan view related to the embodiment of the invention.
Figure 3C:
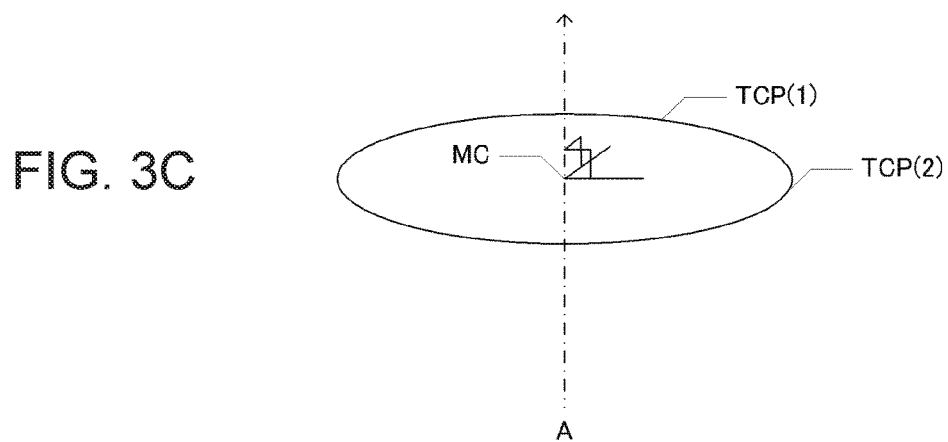
FIG. 3C is an explanatory diagram related to the embodiment of the invention.

In order to perform the image recognition of the reference point, in the present embodiment, a sticker, which has a concentric pattern as shown in FIG. 3B, and is to be stuck on the tip of the tool T, is used as a marker M. The marker M is stuck on the tip of the tool T so that the center MC of the marker M coincides with the reference point. It should be noted that it is sufficient for the shape of the marker to be a shape with which the position of the reference point can be identified using the image recognition, and further, in the case in which the reference point of the tool T itself has a shape which can be detected using the image recognition, there is no need to use the marker for indicating the reference point.

As shown in FIG. 1B, the robot 1 is provided with a motor 131 for driving the rotary shaft member 121, a motor 132 for driving the rotary shaft member 122, a motor 133 for driving the rotary shaft member 123, a motor 134 for driving the rotary shaft member 124, a motor 135 for driving the rotary shaft member 125, a motor 136 for driving the rotary shaft member 126, and a control section 14 for controlling the motors 131 through 136. The motors 131 through 136 are constituents of the arms 111 though 115. The motors 131 through 136 are each a servomotor, which is feedback controlled so that the difference between a target value and a current value vanishes. The control section 14 obtains the target value representing the position and the posture of the TCP from the PC 3, and then derives target values of the motors 131 through 136 based on the target value representing the position and the posture of the TCP.

The imaging section 2 is a digital imaging section provided with the lens 201, the area image sensor 202, an AD converter not shown, and so on. As shown in FIG. 1A, the imaging section 2 is disposed at a predetermined position on a working bench 9, on which the work is mounted, so as to be able to perform imaging in a vertically upward direction. It should be noted that the robot vision of the present embodiment is a two-dimensional robot vision targeting at a reference plane determined in advance so as to be perpendicular to the z axis. Therefore, it is preferable to use a single focus lens shallow in depth of field (short in focal distance) and small in F-value as the lens 201.

The PC 3 is a computer provided with a processor not shown, a main storage not shown and formed of a DRAM, an input/output mechanism not shown, an external storage not shown and formed of a nonvolatile memory, a display, a keyboard functioning as an instruction reception section 30, and so on. The PC 3 executes the tool setting program stored in the external storage with a processor to thereby function as an instruction reception section 30, an image acquisition section 31, a target value derivation section 32, an output section 33, and an offset setting section 35. The functions of the target value derivation section 32 and the output section 33 correspond to the function of an arm control section.

The image acquisition section 31 instructs imaging to the imaging section 2, and then obtains the image, which has been taken in accordance with the instruction, from the imaging section 2.

The target value derivation section 32 holds a template for performing the image recognition of the marker M. The template is used for analyzing the image obtained from the imaging section 2 to detect the coordinate of the reference point in the coordinate system of the imaging section 2. The target value derivation section 32 derives the target values, which are used for changing the arm 11 to predetermined states, based on the image taken by the imaging section 2. Specifically, the target value derivation section 32 derives the target value for achieving a first state in which the reference point is located at the centroid of the image, and the target value for achieving a second state in which the TCP rotates around the reference point from the position in the first state.

The output section 33 outputs the target values derived by the target value derivation section 32 to the control section 14 of the robot 1 to thereby change the positional relationship between the imaging section 2 and the tool T to the first state and the second state.

3. Tool Setting Process

Figure 4:
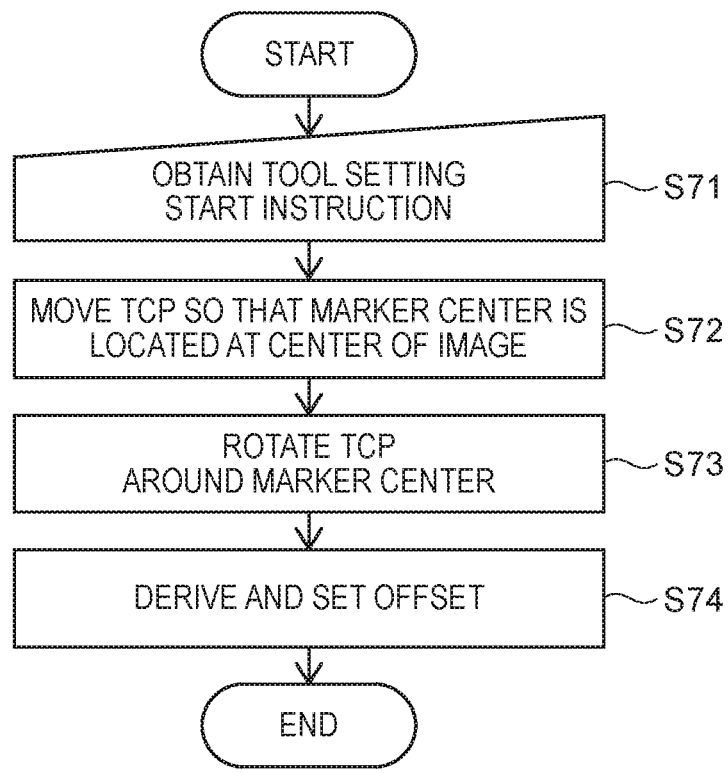
FIG. 4 is a flowchart related to the embodiment of the invention.

Hereinafter, the tool setting process for deriving and setting the position of the marker center MC to the TCP, namely the offset, will be described with reference to FIG. 4.

The tool setting process is started by the operator inputting a tool setting start instruction to the PC 3, and is then completed without requiring any operations to the operator, or with a simple operation. What is required for the operator before inputting the tool setting start instruction is to normally attach the tool T to the tool chuck 1261 and then move the TCP to a position where the marker M can be imaged by the imaging section 2 by a jog feed operation, and to set the offset component of the tool T to the TCP with respect to the direction of the one axis parallel to the rotational axis of the rotary shaft member 126.

Figure 5A:
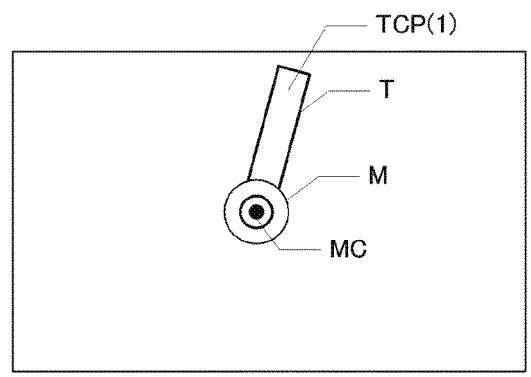
FIGS. 5A, 5B, and 5C are plan views each showing an image related to the embodiment of the invention.

When the instruction reception section 30 obtains (step S71) the tool setting start instruction in accordance with the input of the operator, the PC 3 moves (step S72) the TCP so that the marker center MC is located at the centroid of the image taken by the imaging section 2. The specific process is as follows. When the tool setting start instruction is input, the image acquisition section 31 instructs imaging to the imaging section 2, and then obtains the image data (1) from the imaging section 2. Subsequently, the target value derivation section 32 detects the position of the marker center MC from the image data (1) thus obtained in the coordinate system of the imaging section 2. For the detection of the marker center MC, there is used the template of the marker M prepared in advance. Subsequently, the target value derivation section 32 instructs imaging to the imaging section 2 in the state in which the TCP is translated in each of the x-axis direction and the y-axis direction as much as a predetermined length, and then obtains the image data (2) from the imaging section 2. Subsequently, the target value derivation section 32 detects the position of the marker center MC from the image data (2) thus obtained in the coordinate system of the imaging section 2. Subsequently, the target value derivation section 32 derives a coordinate conversion matrix for converting the displacement of the target in the image coordinate system into the displacement of the target in the robot coordinate system based on the coordinate of the TCP in the robot coordinate system at the time point at which the image data (1) has been taken, the coordinate of the marker center MC in the coordinate system of the imaging section 2 detected from the image data (1), the coordinate of the TCP in the robot coordinate system at the time point at which the image data (2) has been taken, and the coordinate of the marker center MC in the coordinate system of the imaging section 2 detected from the image data (2). Subsequently, the target value derivation section 32 derives the displacement from the marker center MC detected from the image data (2) to the centroid of the image, and then converts the displacement thus derived into the displacement in the x-axis direction and the displacement in the y-axis direction in the robot coordinate system using the coordinate conversion matrix to thereby derive the target value of the TCP for aligning the marker center MC with the centroid of the image taken by the imaging section 2. Subsequently, the output section 33 outputs the target value thus derived to the control section 14 to thereby move the arm 11. As a result, the TCP is translated in each of the x-axis direction and the y-axis direction, and the positional relationship between the imaging section 2, the TCP, and the marker center MC is set to the first state, and thus, the marker center MC is located at the centroid of the image (a first image) taken by the imaging section 2 as shown in FIG. 5A. The centroid of the image taken by the imaging section 2 becomes the control point for associating the image coordinate system and the robot coordinate system with each other. Further, in the state in which the marker center MC is located at the centroid of the image, the marker center MC becomes the point in a working space corresponding to the control point.

When there is achieved the first state, in which the marker center MC is located at the centroid of the image taken by the imaging section 2, the PC 3 changes (step S73) the posture of the arm 11 so that the TCP rotates around the centroid of the image in the image coordinate system. In other words, the PC 3 rotates the tool T around the rotational axis passing through the position indicated by the marker center MC in the state in which the marker center MC indicating the reference point is located at the centroid of the image as the control point. The specific process is as follows.

The target value derivation section 32 derives the x coordinate and the y coordinate of the marker center MC in the robot coordinate system using the coordinate conversion matrix derived in the step S72. Here, since the marker center MC is located at the centroid of the image, if the coordinate of the centroid of the image is converted into the coordinate in the robot coordinate system using the coordinate conversion matrix, the x coordinate and the y coordinate of the marker center MC in the robot coordinate system are derived. Subsequently, the target value derivation section 32 derives the target value for rotating the rotary shaft member 126 as much as a predetermined angle (e.g., 30 degrees) in the state of keeping the rotational axis of the rotary shaft member 126 parallel to the z axis. In the case of rotating the tool T around the TCP, there is a possibility that the marker center MC moves from the centroid of the image to the outside of the image. Therefore, the angle at which the rotary shaft member 126 is rotated is determined in advance within the range in which the marker center MC is located in the image after the rotation. Subsequently, the output section 33 outputs the target value thus derived to the control section 14 to thereby rotate the rotary shaft member 126 (the rotary shaft nearest to the tool T). When rotating the rotary shaft member 126 in such a manner as described above, there is achieved a third state in which the tool T rotates around the rotational axis passing through the TCP and parallel to the z axis.

Figure 5B:
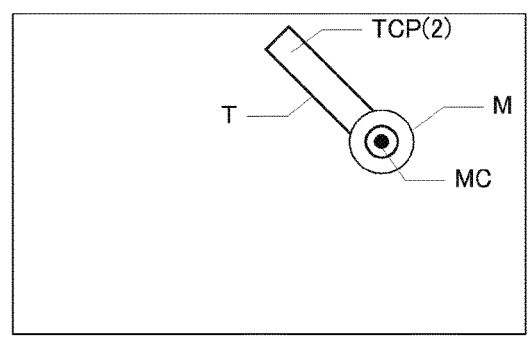

Then, the image acquisition section 31 instructs imaging to the imaging section 2. As a result, the target value derivation section 32 obtains the image (a third image) in the third state in which the tool T has rotated around the TCP. In the third image, the marker center MC is separated from the centroid of the image as shown in FIG. 5B. Then, the target value derivation section 32 derives the target value for moving the marker center MC again to the centroid of the image taken by the imaging section 2 based on the third image.

Figure 5C:
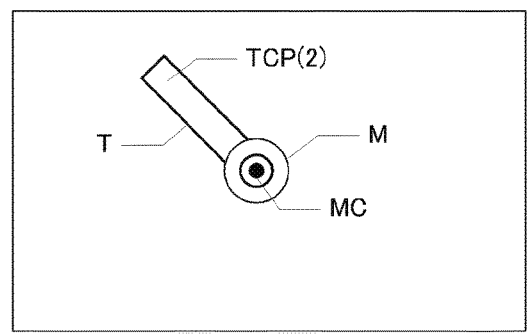
Figure 5D:
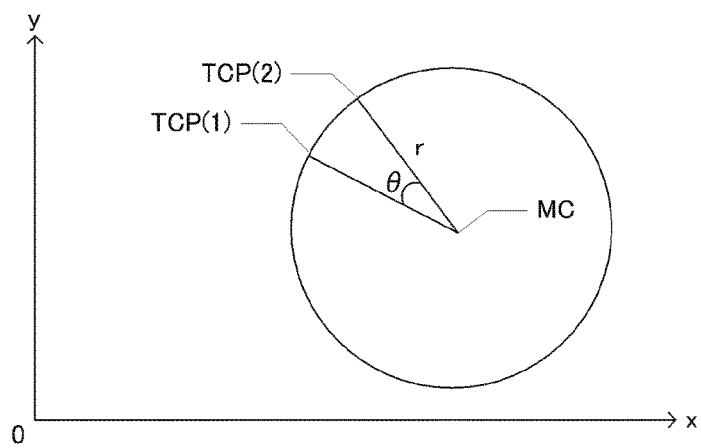
FIG. 5D is a coordinate chart related to the embodiment of the invention.

Subsequently, the output section 33 outputs the target value thus derived based on the third image to the control section 14 to thereby move the arm 11. On this occasion, by the rotation of either two or more of the rotary shaft members 121, 122, 123, 124, 125, and 126, the TCP moves in a direction perpendicular to the z axis. As a result, the TCP rotates around the marker center MC as much as a predetermined angle from the position in the first state, and the positional relationship between the imaging section 2, the TCP, and the marker center MC makes the transition from the first state to the second state via the third state. In the second state, the marker center MC is located at the centroid of the image taken by the imaging section 2 as shown in FIG. 5D. Therefore, it results that in the process of the transition from the first state to the second state, the TCP rotates around the centroid of the image as shown in FIGS. 5A through 5C in the image coordinate system. It should be noted that in the process of the transition from the third state to the second state, it is also possible to take a plurality of images and then perform the feedback control so that the marker center MC is located at the centroid of the image based on the plurality of images thus taken. Thus, even in the state in which the calibration of the coordinate system of the imaging section 2 and the coordinate system of the robot 1 is not accurately performed, it becomes possible to achieve the second state in which the centroid of the image is accurately aligned with the marker center MC. For example, the PC 3 derives the target value so that the marker center MC moves to the centroid of the image taken by the imaging section 2, and then moves the TCP. Subsequently, the PC 3 obtains the image from the imaging section 2 to derive the distance between the centroid of the image and the marker center MC, and then determines whether or not the distance between the centroid of the image and the marker center MC is shorter than a predetermined threshold value. If the distance between the centroid of the image and the marker center MC is not shorter than the threshold value, the PC 3 accurately makes the transition to the second state by repeatedly deriving the target value so that the marker center MC moves to the centroid of the image and then moving the TCP until the distance between the centroid of the image and the marker center MC becomes shorter than the predetermined threshold value.

Since the centroid of the image corresponds to the optical axis of the lens 202, the distortion of the lens 202 is smaller compared to the distortions in the parts off from the centroid of the image. Therefore, even in the state in which the robot coordinate system and the image coordinate system are not accurately calibrated with each other as in the case of the present embodiment, there occurs a small distortion in the relationship between the control point as the rotational center of the TCP in the image coordinate system and the centroid of the image. However, in the present embodiment, since it is sufficient that the TCP can be rotated around the control point, even if there occurs a distortion in the relationship between the control point and a specific point on the image, there occurs no problem as long as the specific point is not moved. Therefore, the point corresponding to the control point for rotating the TCP is not required to be the centroid of the image.

When rotating the TCP centered on the centroid of the image in the image coordinate system, the PC 3 derives and then sets (step S74) the offset of the marker center MC to the TCP based on the position of the TCP in the state, in which the step S72 has been executed, and the position of the TCP in the step S73. Here, the first state and the second state will be described in the robot coordinate system with reference to FIG. 5D. Firstly, the state in which the first image shown in FIG. 5A can be taken by the imaging section 2 corresponds to the first state, and the state in which the posture of the arm 11 is changed so that the TCP rotates around the centroid of the image to thereby make it possible for the imaging section 2 to take the second image shown in FIG. 5C corresponds to the second state. It should be noted that although it is necessary for deriving the offset to identify the position of the TCP for achieving the first state in which the first image shown in FIG. 5A can be taken by the imaging section 2, and the position of the TCP for achieving the second state in which it becomes possible for the imaging section 2 to take the second image shown in FIG. 5C in the robot coordinate system, it is not necessarily required to take the first image and the second image. In the process of the transition from the first state to the second state, the TCP rotates around the marker center MC without moving in the z direction. In this process, the TCP draws an arc locus centered on the marker center MC. The radius of the arc is equal to the distance from the TCP to the marker center MC, and the central angle of the arc is equal to the rotational angle of the TCP in the transition from the first state to the second state. Therefore, the offset setting section 35 express the x, y coordinates of the TCP with the x, y coordinates of the marker center MC, the central angle θ of the arc, and the radius r of the arc to solve the simultaneous equation, and thus derives the x coordinate and the y coordinate of the marker center MC in the robot coordinate system. The x coordinate and the y coordinate of the TCP in both of the first state and the second state are known, and the correspondence relationship between the robot coordinate system and the coordinate system (the coordinate system fixed to the TCP) fixed to the rotary shaft member 126 is also known. Therefore, the offset setting section 35 derives and sets the offset component of the tool T to the TCP with respect to each of the directions of the two axes perpendicular to the rotational axis of the rotary shaft member 126 based on the x coordinate and the y coordinate of the TCP in either one of the first state and the second state, and the x coordinate and the y coordinate of the marker center MC.

Figure 6A:
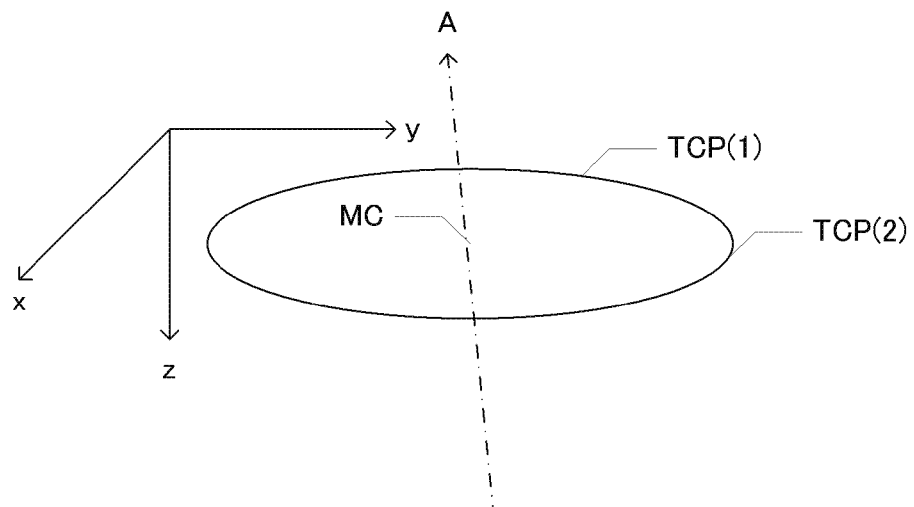
FIG. 6A is an explanatory diagram related to the embodiment of the invention.
Figure 6B:
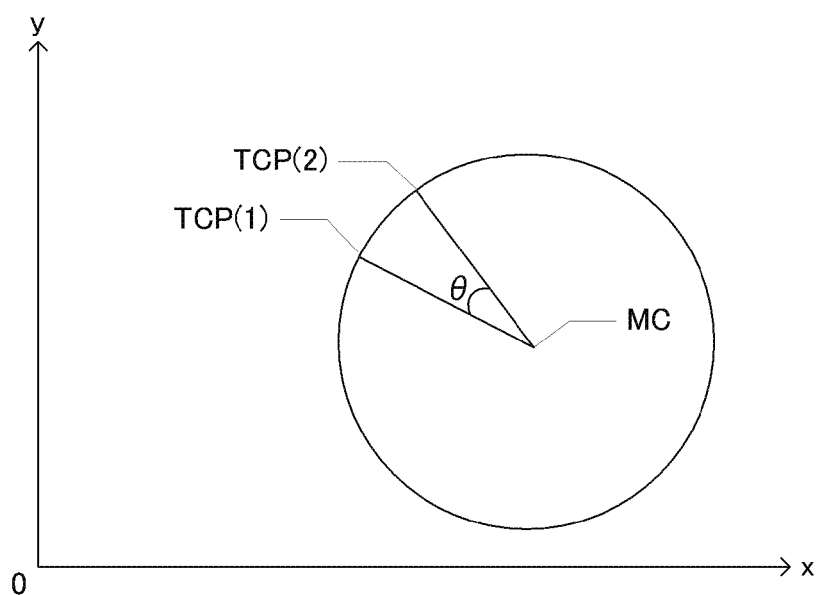
FIG. 6B is a coordinate chart related to the embodiment of the invention.

Incidentally, although in the present embodiment, it is assumed that the imaging direction A of the imaging section 2 and the z axis in the robot coordinate system are parallel to each other, even in the case in which the imaging direction A of the imaging section 2 and the z axis in the robot coordinate system are nonparallel to each other as shown in FIG. 6A, the offset of the tool T can be derived without any problem. In other words, the rotational axis of the TCP in the process of the transition from the first state to the second state can be parallel or nonparallel to the imaging direction A of the imaging section 2. The reason for this is that in the transition from the first state to the second state, the TCP rotates not around an axis parallel to the imaging direction A, but around an axis parallel to the z axis, there is no need to use the image coordinate of the TCP when deriving the offset in the step S74, and the offset can be derived by solving the equations in the robot coordinate system. In other words, this is because even if the imaging direction A of the imaging section 2 and the z axis in the robot coordinate system are nonparallel to each other as shown in FIG. 6A, the relationship between the TCP and the marker center MC in the robot coordinate system is the same as the relationship in the case in which the imaging direction A of the imaging section 2 and the z axis in the robot coordinate system are parallel to each other as shown in FIG. 6B. Therefore, in the process of the transition from the first state to the second state, the rotational axis which the TCP rotates around is not required to be parallel to the z axis or the imaging direction A. It is also possible to translate the tool T so that the marker center MC moves to the centroid of the image by, for example, rotating one of the rotary shaft members other than the rotary shaft member 126 and nonparallel to the z axis, and rotating other two rotary shaft members each having the rotational axis parallel to the rotational axis of the rotary shaft member thus rotated when rotating the tool T in the first state.

In the tool setting process described hereinabove, only by moving the TCP to the position where the marker M can be imaged by the imaging section 2 using the jog feed operation, it is possible to automatically derive and then set the offset of the tool T to the TCP with respect to the components in the remaining two axes except the one axis parallel to the rotational axis of the rotary shaft member 126. Therefore, it becomes possible to easily perform setting of the offset of the robot 1 in a short time. Further, in the case of rotating the tool T around the marker center MC as the reference point in the real space corresponding to the control point in the image, even if which one of the points in the real space the control point corresponds to is unknown, it is possible to rotate the tool T around the reference point as one of the points in the real space as long as the arm 11 is controlled based on the image taken by the imaging section 2. In other words, even in the state in which the coordinate system of the imaging section 2 and the coordinate system of the robot 1 are not calibrated with each other, the offset of the tool T to the TCP of the arm 11 can automatically be set.

4. Offset Setting of Imaging Section

Figure 7:
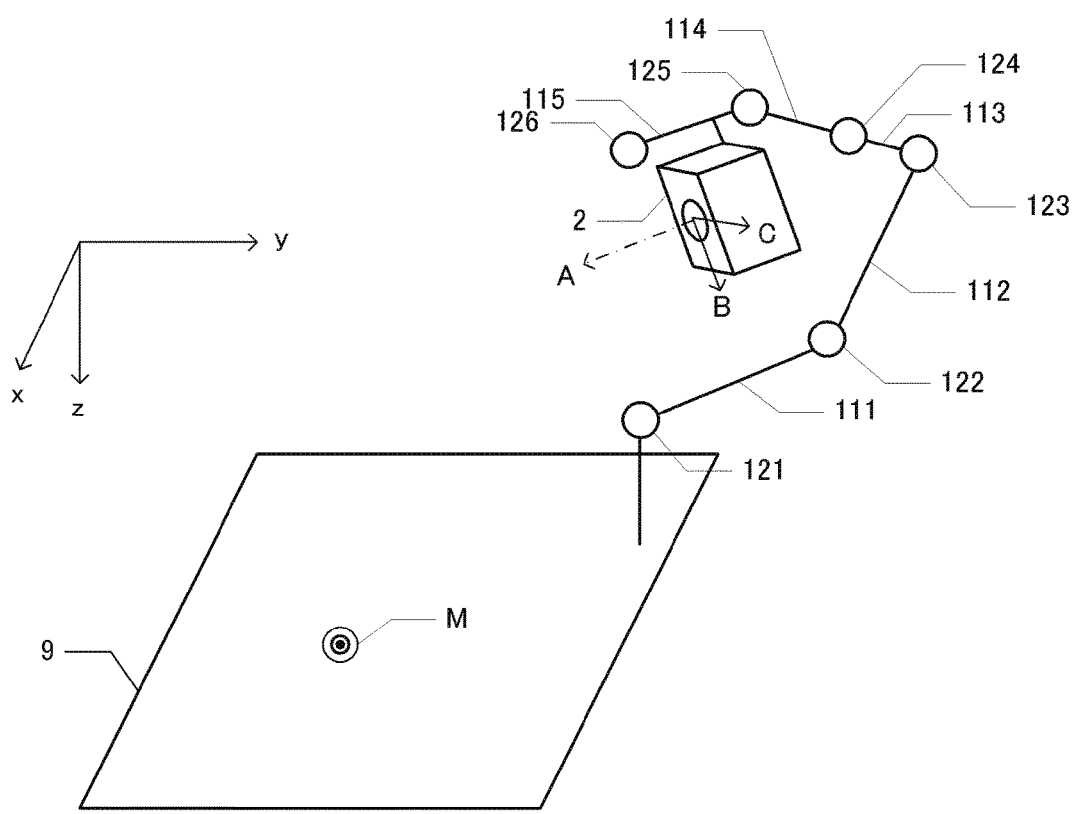
FIG. 7 is a schematic perspective view related to the embodiment of the invention.

The tool offset process described hereinabove can be applied to an operation of deriving and setting the offset of the imaging section 2 to the arm 11 in order to use the robot 1 in the state in which the imaging section 2 is attached to the arm 11. Hereinafter, a method of deriving and then setting the offset of the imaging section 2 attached to the fifth arm 115 as shown in FIG. 7 will be described. Here, it is assumed that the imaging section 2 is fixed to the fifth arm 115 with stays or the like so that the imaging direction A becomes parallel to the rotational axis of the rotary shaft member 126. Further, the reference plane determined in advance so as to be perpendicular to the z axis is set as the target of the robot vision. In other words, the control of the robot 1 using the image output form the imaging section 2 is performed in the state in which the imaging direction A of the imaging section 2 is perpendicular to the z axis. On such an assumption as described above, the offset of the imaging section 2 is set as a coordinate in the coordinate system, which has one axis parallel to the rotational axis of the fifth arm 115, and two axes perpendicular to the one axis, and rotates together with the rotational axis of the fifth arm 115. In more detail, it is assumed that the value obtained by expressing the position of the optical axis of the lens 202 with the coordinates in the two axes perpendicular to the rotational axis of the fifth arm 115 is derived as the offset of the imaging section 2.

In the case of deriving and setting such an offset of the imaging section 2, it is necessary to rotate the imaging section 2 on the x-y plane around the reference point fixed to the reference plane. Therefore, assuming the top surface of the working bench 9 as the reference plane, it is determined that the marker M is stuck on the top surface of the working bench 9, and the center MC of the marker M is used as the reference point. Then, assuming the center MC of the marker M stuck on the working bench 9 imaged by the imaging section 2 fixed to the fifth arm 115 as the center MC of the marker M stuck to the tool T to be imaged by the imaging section 2 fixed to the working bench 9, the offset of the imaging section 2 to the arm 11 can be derived and set in completely the same procedure as the procedure of the tool offset process described above. Further, in the case of rotating the imaging section 2 around the reference point in the real space corresponding to the control point in the image, even if which one of the points in the real space the control point corresponds to is unknown, it is possible to rotate the imaging section 2 around the reference point as one of the points in the real space as long as the arm 11 is controlled based on the image taken by the imaging section 2. In other words, even in the state in which the coordinate system of the imaging section 2 and the coordinate system of the robot 1 are not calibrated with each other, the offset of the imaging section 2 to the arm 11 can automatically be set.

The procedure of deriving and setting the offset of the imaging section 2 will be described with reference to FIG. 4. The operator normally attaches the imaging section 2 to the fifth arm 115, then sticks the marker M to the working bench, and then moves the TCP to the position where the marker M can be imaged by the imaging section 2 using the jog feed operation before inputting the tool setting start instruction to the PC 3.

When the instruction reception section 30 obtains (step S71) the tool setting start instruction in accordance with the input of the operator, the PC 3 moves (step S72) the TCP so that the marker center MC is located at the centroid of the image taken by the imaging section 2 to thereby achieve the first state. Here, the position of the TCP is irrelevant to the rotation of the rotary shaft member 126, and the position of the TCP and the position of the imaging section 2 are determined by the rotational angles of the rotary shaft members 121 through 125. In other words, the positional relationships between the imaging section 2, the fifth arm 115, and the TCP are fixed to each other. Therefore, the process in the step S72 performed when deriving the offset of the tool T and the process in the step S72 performed when deriving the offset of the imaging section 2 are the same as each other.

When there is achieved the first state, in which the marker center MC is located at the centroid of the image taken by the imaging section 2, the PC 3 changes (step S73) the posture of the arm 11 so that the TCP rotates around the centroid of the image in the image coordinate system to achieve the second state. Here, the positional relationships between the imaging section 2, the fifth arm 115, and the TCP are also fixed to each other. Therefore, the process in the step S73 performed when deriving the offset of the tool T and the process in the step S73 performed when deriving the offset of the imaging section 2 are the same as each other. Specifically, in the process of the transition from the first state to the second state, the image acquisition section 31 obtains the third image, in which the marker center MC is separated from the centroid of the image, from the imaging section 2, and the target value derivation section 32 derives the target value for achieving the second state based on the third image.

When rotating the TCP centered on the centroid of the image in the image coordinate system to achieve the second state, the PC 3 derives and then sets (step S74) the offset of the imaging section 2 to the fifth arm 115 based on the position of the TCP in the state, in which the step S72 has been executed, and the position of the TCP in the step S73. Here, the positional relationships between the imaging section 2, the fifth arm 115, and the TCP are also fixed to each other. Therefore, the process in the step S74 performed when deriving the offset of the tool T and the process in the step S74 performed when deriving the offset of the imaging section 2 are the same as each other.

It should be noted that, as already described above, although the offset of the imaging section 2 is derived assuming that the imaging direction A of the imaging section 2 and the z axis in the robot coordinate system are parallel to each other, even if the imaging direction A of the imaging section 2 and the z axis in the robot coordinate system are nonparallel to each other, the offset of the imaging section 2 can be derived without any problem.

5. Other Embodiments

It should be noted that the scope of the invention is not limited to the embodiment described above, but it is obvious that a variety of modifications can also be applied within the scope or the spirit of the invention. For example, the invention can also be applied to vertical articulated robots other than the six-axis vertical articulated robot, and can also be applied to scalar robots, the rotational axes of the arms of which are all parallel to each other.

The entire disclosure of Japanese Patent Application No. 2015-068273, filed Mar. 30, 2015 is expressly incorporated by reference herein.

What is claimed is:

1. A robot comprising:
an arm, to which a tool can be attached, and which is capable of moving the tool to a commanded position;
a camera configured to capture images of the tool; and
a controller configured to control the movement of the arm,
wherein the controller controls the movement of the arm using an offset of a reference point of the tool to the arm, the offset based on a first image, a second image, and a third image,
wherein the first image is captured by the camera, the first image capturing the tool in a first state where the reference point is located at a control point of the first image,
wherein the second image is captured by the camera, the second image capturing the tool in a second state where the tool is rotated around a rotational axis passing through a position of the reference point in the first state, and
wherein the third image is captured by the camera, the third image capturing the tool in a third state where the reference point is shifted from the control point during a process of a transition of the tool from the first state to the second state.

2. The robot according to claim 1 wherein
the arm has a plurality of rotary shafts, and makes a transition from the first state to a third state, in which the third image can be taken by the camera, in accordance with a rotation of either one of the rotary shafts.

3. The robot according to claim 2 wherein
the arm makes the transition from the first state to the third state in accordance with the rotation of the rotary shaft closest to the tool out of the plurality of rotary shafts.

4. The robot according to claim 1 wherein
the arm is feedback controlled to make a transition from the third state to the second state based on a plurality of images taken by the camera.

5. The robot according to claim 1 wherein
the rotational axis is parallel to an imaging direction of the camera.

6. The robot according to claim 1 wherein
the rotational axis is nonparallel to an imaging direction of the camera.

7. The robot according to claim 1 wherein
the robot is a scalar type.

8. A robot comprising:
an arm to which a camera is attached, and which is capable of moving in a working space; and
a controller configured to control the movement of the arm, wherein the controller controls the movement of the arm using an offset of the camera to the arm, the offset being set based on a first image and a second image captured by the camera, the first image capturing a first state in which a reference point in the working space is located at a control point of the first image and the second image capturing a second state in which the imaging section is rotated around a rotational axis passing through a position of the reference point in the first state, and wherein the controller controls movement of the arm based on a third image, which is taken by the camera, and in which the reference point is shifted from the control point, in a process of a transition from the first state to the second state.

9. A robotic system comprising:

a camera;

an arm configured to move within a working space, wherein the camera is configured to capture images of the arm;

an offset setting section adapted to set an offset of a reference point of a tool to the arm, the tool being attached to the arm, the offset being set based on a first state in a first image and a second state in a second image, the first image and the second image being captured by the camera, the first image capturing the tool in the first state where the reference point is located at a control point of the first image and the second image capturing the tool in the second state where the tool is rotated around a rotational axis passing through a position of the reference point in the first state; and an arm control section adapted to control the arm to which the tool is attached based on a third image captured by the camera, the third image capturing the reference point shifted from the control point during a process of a transition of the tool from the first state to the second state, and adapted to control the arm using the offset in a case in which the offset is set.

10. A robotic system comprising:

an arm capable of moving in a working space;

an image capturing device attached to the arm, the image capturing device being configured to capture a first image of the arm in a first state, a second image of the arm in a second state, and a third image;

an offset setting section adapted to set an offset of the imaging section to the arm, the offset being set based on the first state, in which a reference point in the working space is located at a control point of the first image, and a second state in which the image capturing device is rotated around a rotational axis passing through a position of the reference point in the state in which the reference point is located at the control point; and an arm control section adapted to control the arm to which the image capturing device is attached based on the third image in which the reference point is shifted from the control point in a process of a transition from the first state to the second state, and is adapted to control the arm using the offset in a case in which the offset is set.

11. A robot control device adapted to control a robot provided with an arm capable of moving in a working space which can be imaged by an image capturing device, the robot control device comprising:

an offset setting section adapted to set an offset of a reference point of a tool to the arm, the tool being attached to the arm, the offset being set based on a first state in a first image and a second state in a second image, the first image and the second image being captured by the image capturing device, the first image capturing the tool in the first state where the reference point is located at a control point of the first image, and the second image capturing the tool in the second state where the tool is rotated around a rotational axis passing through a position of the reference point in the first state; and an arm control section adapted to control the arm to which the tool is attached based on a third image captured by the image capturing device, the third image capturing the reference point shifted from the control point during a process of a transition of the tool from the first state to the second state, and adapted to control the arm using the offset in a case in which the offset is set.

12. A robot control device adapted to control a robot provided with an arm to which a camera is attached, the arm being capable of moving in a working space, the robot control device comprising:

an offset setting section adapted to set an offset of the camera to the arm, the offset being set based on a first state, captured by a first image, in which a reference point in the working space is located at a control point of the first image and a second state, captured by a second image in which the camera is rotated around a rotational axis passing through a position of the reference point in the first state; and an arm control section adapted to control the arm to which the camera is attached based on a third image, captured by the camera, in which the reference point is shifted from the control point in a process of a transition from the first state to the second state, and is adapted to control the arm using the offset in a case in which the offset is set.

* * * * *